United States Patent
Chen et al.

(10) Patent No.: US 11,291,052 B2
(45) Date of Patent: Mar. 29, 2022

(54) METHOD AND APPARATUS FOR IMPROVING MSG3 TRANSMISSION OF RANDOM ACCESS PROCEDURE IN A WIRELESS COMMUNICATION SYSTEM

(71) Applicant: ASUSTek Computer Inc., Taipei (TW)

(72) Inventors: Wei-Yu Chen, Taipei (TW); Li-Chih Tseng, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 16/052,505

(22) Filed: Aug. 1, 2018

(65) Prior Publication Data

US 2018/0359785 A1 Dec. 13, 2018

Related U.S. Application Data

(62) Division of application No. 15/663,674, filed on Jul. 28, 2017.

(60) Provisional application No. 62/367,875, filed on Jul. 28, 2016.

(51) Int. Cl.
| | | |
|---|---|---|
| *H04W 74/00* | (2009.01) | |
| *H04W 74/08* | (2009.01) | |
| *H04W 48/16* | (2009.01) | |
| *H04W 72/12* | (2009.01) | |
| *H04L 1/16* | (2006.01) | |

(52) U.S. Cl.
CPC ....... *H04W 74/0833* (2013.01); *H04W 48/16* (2013.01); *H04W 72/1284* (2013.01); *H04W 74/006* (2013.01); *H04L 1/1607* (2013.01)

(58) Field of Classification Search
CPC ............. H04W 74/0833; H04W 48/16; H04W 72/1284; H04W 74/006; H04L 1/1607
See application file for complete search history.

(56) References Cited

U.S. PATENT DOCUMENTS

| | | | |
|---|---|---|---|
| 2007/0268812 A1 | 11/2007 | Yoon et al. | |
| 2009/0252125 A1 | 10/2009 | Vujcic | |
| 2010/0177675 A1* | 7/2010 | Ai | H04L 12/189 |
| | | | 370/312 |
| 2010/0278064 A1 | 11/2010 | Jeong | |

(Continued)

FOREIGN PATENT DOCUMENTS

| | | |
|---|---|---|
| CN | 102422568 A | 4/2012 |
| CN | 102740407 A | 10/2012 |

(Continued)

OTHER PUBLICATIONS

Indian Office Action from corresponding IN Application No. 201744026864 dated Mar. 9, 2020, 7 pgs.

(Continued)

*Primary Examiner* — Pakee Fang
(74) *Attorney, Agent, or Firm* — Cooper Legal Group, LLC

(57) ABSTRACT

A method and apparatus are disclosed, from the perspective of the UE, for performing random access procedure. In one embodiment, the method includes the UE receiving a message from a network. The message includes a TTI information of Msg3. In addition, the method includes the UE transmitting a preamble to the network. The method also includes the UE receiving a Msg2 from the network for responding the preamble. The method further includes the UE performing a Msg3 transmission to the network according to the TTI information of Msg3.

14 Claims, 19 Drawing Sheets

(56) References Cited

U.S. PATENT DOCUMENTS

2012/0147830 A1* 6/2012 Lohr ............... H04L 1/1854
370/329
2016/0183243 A1 6/2016 Park
2016/0366705 A1* 12/2016 Mujtaba ............ H04W 72/0413

FOREIGN PATENT DOCUMENTS

| | | |
|---|---|---|
| CN | 105052065 A | 11/2015 |
| CN | 105122710 A | 12/2015 |
| JP | 2014511080 A | 5/2014 |
| JP | 2016072843 A | 5/2016 |

OTHER PUBLICATIONS

Nokia Networks: "Basic system design for UL NB-IoT", 3GPP Draft; R1-160041, 3rd Generation Partnership Project (3GPP), Mobile Competence Centre ; 650, Route Des Lucioles ; F-06921 Sophia-Antipolis Cedex ; France, vol. RAN WG1,No. Budapest, HU; Jan. 18, 2016-Jan. 20, 2016 Jan. 17, 2016 (Jan. 17, 2016), XP051053364.

Qualcomm Europe: "RACH procedure", 3GPP Draft; R2-070212, 3rd Generation Partnership Project (3GPP), Mobile Competence Centre ; 650, Route Des Lucioles ; F-06921 Sophia-Antipolis Cedex ; France, vol. RAN WG2, No. Sorrento, Italy; Jan. 12, 2007, Jan. 12, 2007 (Jan. 12, 2007), XP050133313, [retrieved on Jan. 12, 2007].

Communication pursuant to Article 94(3) from European Patent Office in corresponding EP Application No. 17183827.9, dated Jan. 7, 2020.

Corresponding European Patent Application No. 17183827.9, Office Action dated Sep. 25, 2020.

"3 Generation Partnership Project; Technical Specification Group Radio Access Network; Evolved Universal Terrestrial Radio Access (E-UTRA); Physical Layer Procedures (Release 13)", 3GPP Standard; 3GPP TS 36.213, 3rd Generation Partnership Project (3GPP) Mobile Competence Centre; 650, Route Des Lucioles; F-06921 Sophia-Antipolis Ceded; France vol. RAN WG1, No. V13.2.0, Jun. 30, 2016, pp. 45-254.

Corresponding Japanese patent application No. 2019-201501, Office Action dated Feb. 2, 2021. English Translation.

* cited by examiner

METHOD AND APPARATUS FOR IMPROVING MSG3 TRANSMISSION OF RANDOM ACCESS PROCEDURE IN A WIRELESS COMMUNICATION SYSTEM

CROSS-REFERENCE TO RELATED APPLICATIONS

This application is a Divisional of U.S. patent application Ser. No. 15/663,674, filed Jul. 28, 2017, which claims the benefit of U.S. Provisional Patent Application Ser. No. 62/367,875 filed on Jul. 28, 2016, the entire disclosure of which are incorporated by reference.

FIELD

This disclosure generally relates to wireless communication networks, and more particularly, to a method and apparatus for improving Msg3 transmission of random access procedure in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed, from the perspective of the UE, for performing random access procedure. In one embodiment, the method includes the UE receiving a message from a network. The message includes a TTI (Transmission Time Interval) information of Msg3. In addition, the method includes the UE transmitting a preamble to the network. The method also includes the UE receiving a Msg2 from the network for responding the preamble. The method further includes the UE performing a Msg3 transmission to the network according to the TTI information of Msg3.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including: TR 38.913 v0.3.0, "Study on Scenarios and Requirements for Next Generation Access Technologies"; TS 36.300 v13.2.0, "Overall Description; Stage 2"; TS 36.913, v13.0.0, "Requirements for further advancements for Evolved Universal Terrestrial Radio Access (E-UTRA)"; TS 36.331 v13.2.0, "Radio Resource Control (RRC); Protocol specification"; TS 36.321 v13.1.0, "Medium Access Control (MAC) protocol specification"; and R2-163445, "Scheduling Framework and Requirements", Nokia and Alcatel-Lucent Shanghai Bell. The standards and documents listed above are hereby expressly incorporated by reference in their entirety.

Figure 1:
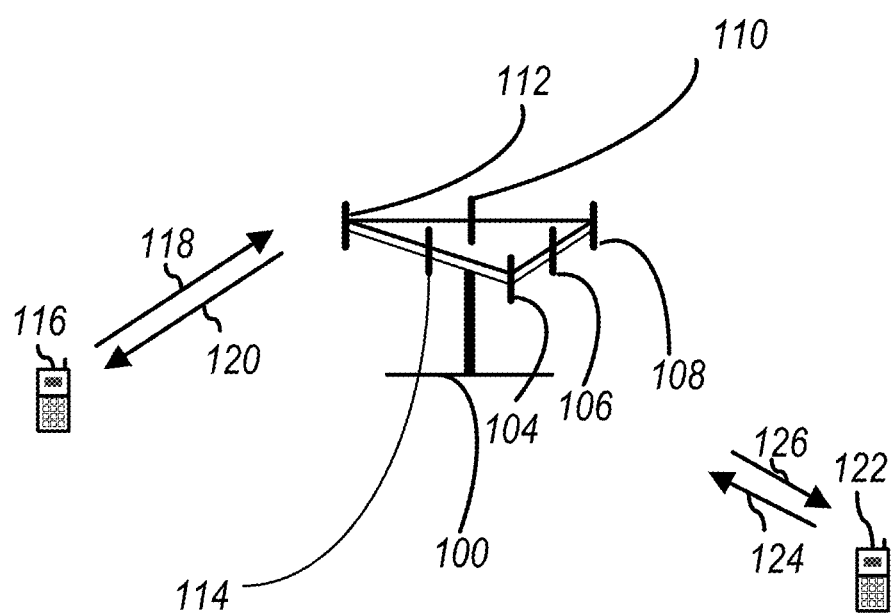
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
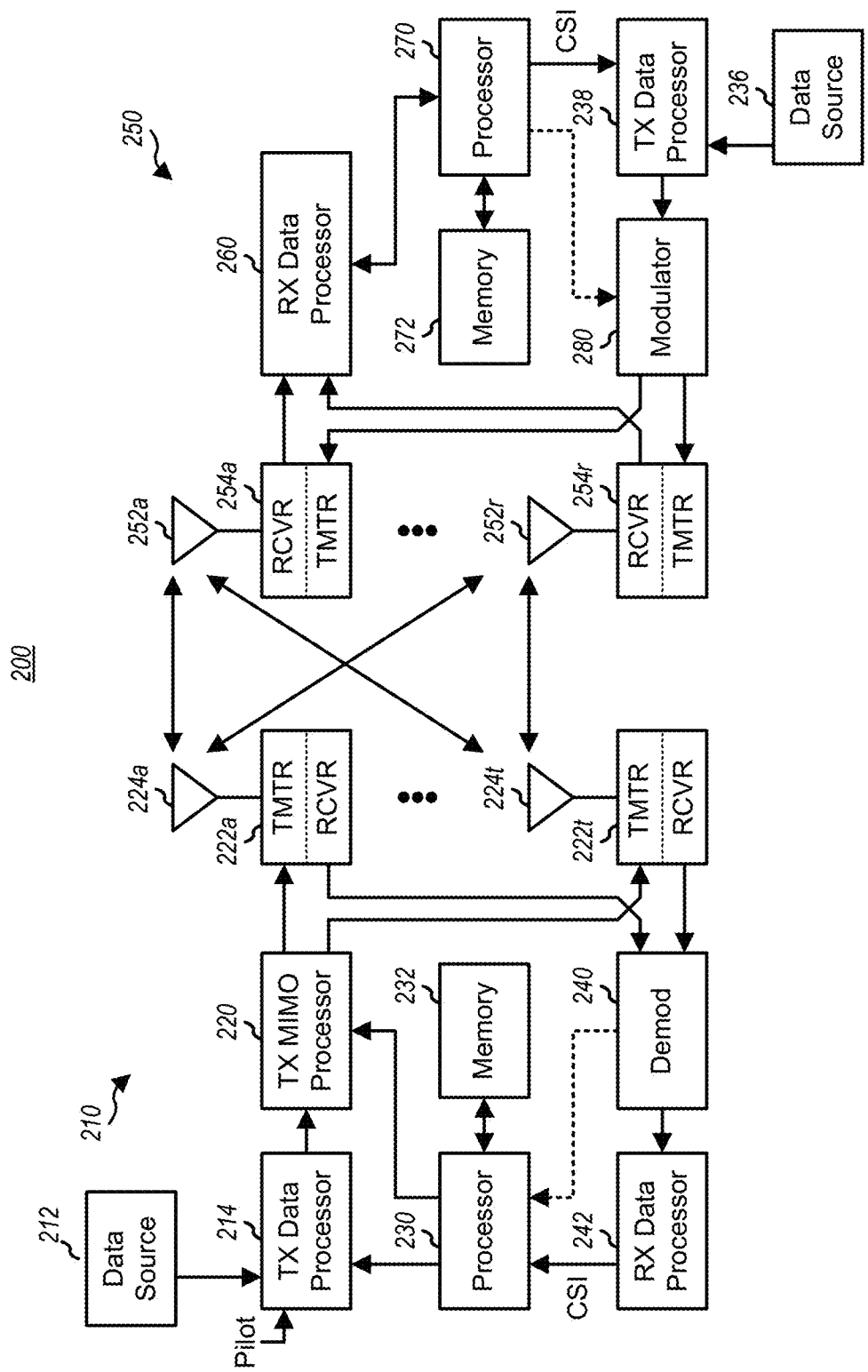
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
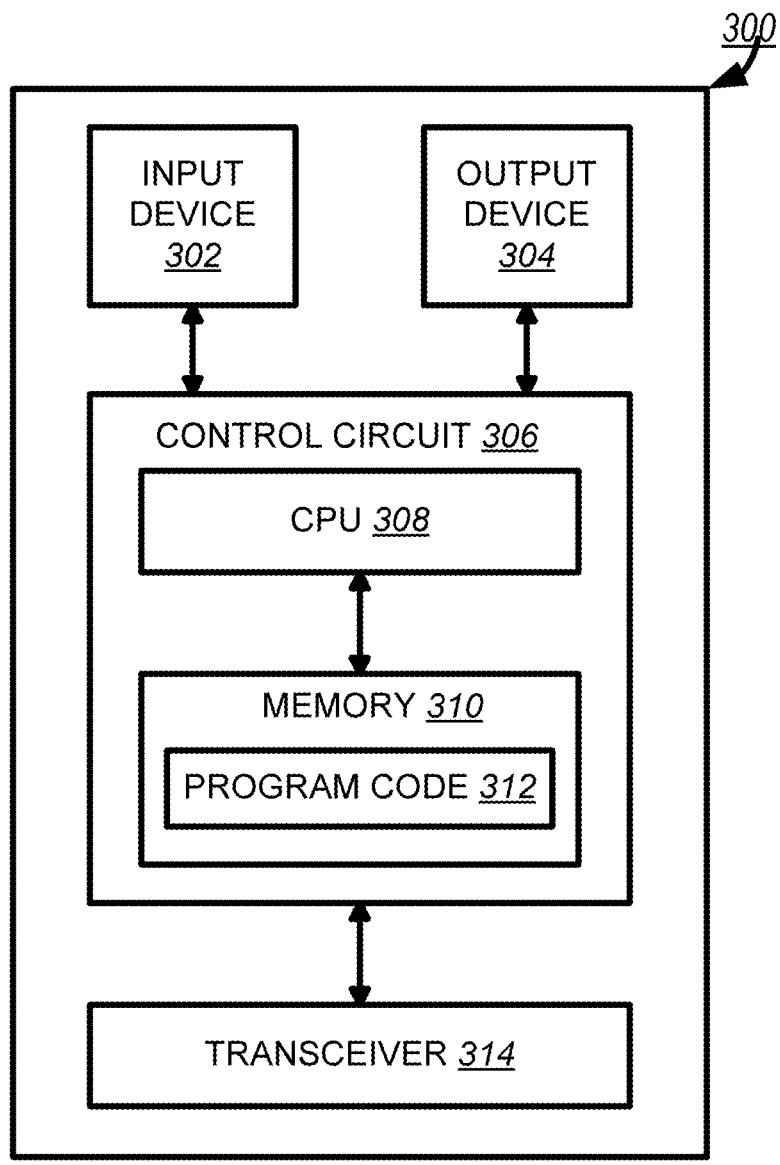
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
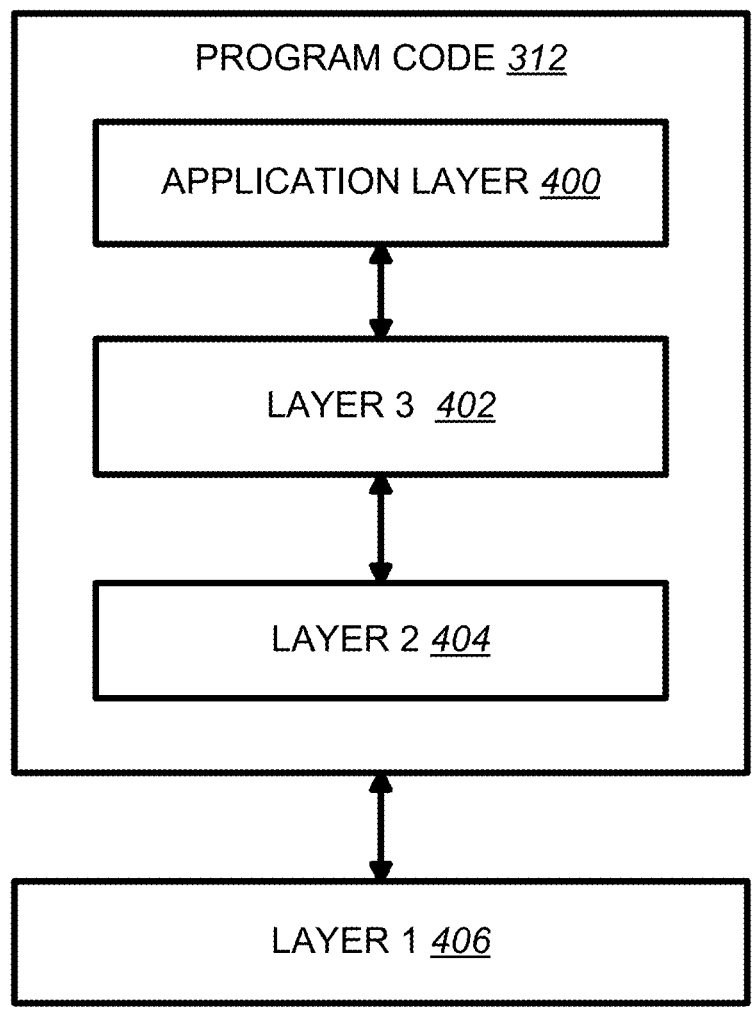
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

One of the general objectives of the present application is to study the frame structure used in New RAT (NR) for 5G, to accommodate various type of requirement (discussed in 3GPP TR 38.913) for time and frequency resource, e.g., from ultra-low latency (~0.5 ms) to expected longer TTI (Transmission Time Interval) for MTC (Machine Type Communication), from high peak rate for eMBB (enhanced Mobile Broadband) to very low data rate for MTC. An important focus is low latency aspect, while other aspect of mixing/adapting different TTIs can also be considered in the study. In addition to diverse services and requirements, forward compatibility is an important consideration in initial NR frame structure design as not all features of NR would be included in the beginning phase/release.

3GPP TS 36.300 includes the following random access (RA) procedure related description:

10.1.5 Random Access Procedure

The random access procedure is characterized by:
  Common procedure for FDD and TDD;
  One procedure irrespective of cell size and the number of serving cells when CA is configured;
The random access procedure is performed for the following events related to the PCell:
  Initial access from RRC_IDLE;
  RRC Connection Re-establishment procedure;
  Handover;
  DL data arrival during RRC_CONNECTED requiring random access procedure:
    E.g. when UL synchronisation status is "non-synchronised".
  UL data arrival during RRC_CONNECTED requiring random access procedure:
    E.g. when UL synchronisation status is "non-synchronised" or there are no PUCCH resources for SR available.
  For positioning purpose during RRC_CONNECTED requiring random access procedure;
    E.g. when timing advance is needed for UE positioning.
The random access procedure is also performed on a SCell to establish time alignment for the corresponding sTAG. In DC, the random access procedure is also performed on at least PSCell upon SCG addition/modification, if instructed, or upon DL/UL data arrival during RRC_CONNECTED requiring random access procedure. The UE initiated random access procedure is performed only on PSCell for SCG. Furthermore, the random access procedure takes two distinct forms:
  Contention based (applicable to first five events);
  Non-contention based (applicable to only handover, DL data arrival, positioning and obtaining timing advance alignment for a sTAG).
Normal DL/UL transmission can take place after the random access procedure.

An RN supports both contention-based and non-contention-based random access. When an RN performs the random access procedure, it suspends any current RN subframe configuration, meaning it temporarily disregards the RN subframe configuration. The RN subframe configuration is resumed at successful random access procedure completion.

10.1.5.1 Contention Based Random Access Procedure

Figure 5:
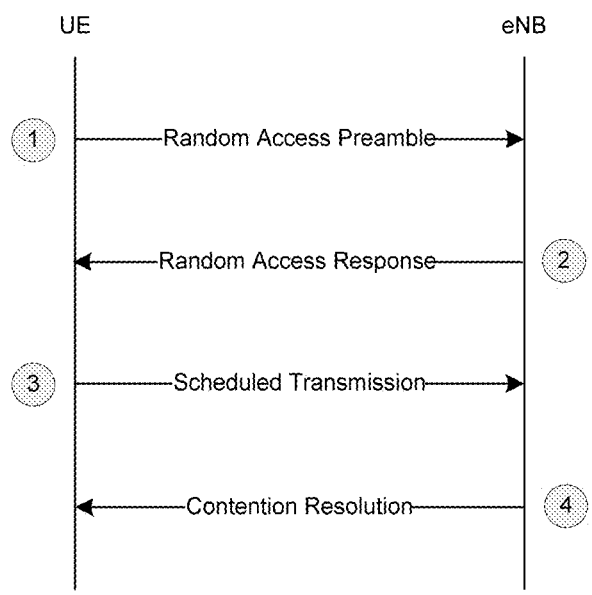
FIG. 5 is a reproduction of FIG. 10.1.5.1-1 of 3GPP TS 36.300 v13.2.0.

The contention based random access procedure is outlined on FIG. 10.1.5.1-1 below:
  [FIG. 10.1.5.1-1 of 3GPP TS 36.300 v13.2.0 is reproduced as FIG. 5]
The four steps of the contention based random access procedures are:
  1) Random Access Preamble on RACH in uplink:
    There are two possible groups defined and one is optional. If both groups are configured the size of message 3 and the pathloss are used to determine which group a preamble is selected from. The group to which a preamble belongs provides an indication of the size of the message 3 and the radio conditions at the UE. The preamble group information along with the necessary thresholds are broadcast on system information.
  2) Random Access Response generated by MAC on DL-SCH:
    Semi-synchronous (within a flexible window of which the size is one or more TTI) with message 1;
    No HARQ;
    Addressed to RA-RNTI on PDCCH;
    Conveys at least RA-preamble identifier, Timing Alignment information for the pTAG, initial UL grant and assignment of Temporary C-RNTI (which may or may not be made permanent upon Contention Resolution);
    Intended for a variable number of UEs in one DL-SCH message.
  3) First scheduled UL transmission on UL-SCH:
    Uses HARQ;
    Size of the transport blocks depends on the UL grant conveyed in step 2.
    For initial access:
      Conveys the RRC Connection Request generated by the RRC layer and transmitted via CCCH;
      Conveys at least NAS UE identifier but no NAS message;
      RLC TM: no segmentation.
    For RRC Connection Re-establishment procedure:
      Conveys the RRC Connection Re-establishment Request generated by the RRC layer and transmitted via CCCH;
      RLC TM: no segmentation;
      Does not contain any NAS message.
    After handover, in the target cell:
      Conveys the ciphered and integrity protected RRC Handover Confirm generated by the RRC layer and transmitted via DCCH;
      Conveys the C-RNTI of the UE (which was allocated via the Handover Command);
      Includes an uplink Buffer Status Report when possible.
    For other events:
      Conveys at least the C-RNTI of the UE.
  4) Contention Resolution on DL:
    Early contention resolution shall be used i.e. eNB does not wait for NAS reply before resolving contention;
    Not synchronised with message 3;
    HARQ is supported;

Addressed to:
The Temporary C-RNTI on PDCCH for initial access and after radio link failure;
The C-RNTI on PDCCH for UE in RRC CONNECTED.
HARQ feedback is transmitted only by the UE which detects its own UE identity, as provided in message 3, echoed in the Contention Resolution message;
For initial access and RRC Connection Re-establishment procedure, no segmentation is used (RLC-TM).

The Temporary C-RNTI is promoted to C-RNTI for a UE which detects RA success and does not already have a C-RNTI; it is dropped by others. A UE which detects RA success and already has a C-RNTI, resumes using its C-RNTI.

When CA is configured, the first three steps of the contention based random access procedures occur on the PCell while contention resolution (step 4) can be cross-scheduled by the PCell. When DC is configured, the first three steps of the contention based random access procedures occur on the PCell in MCG and PSCell in SCG. When CA is configured in SCG, the first three steps of the contention based random access procedures occur on the PSCell while contention resolution (step 4) can be cross-scheduled by the PSCell.

10.1.5.2 Non-Contention Based Random Access Procedure

Figure 6:
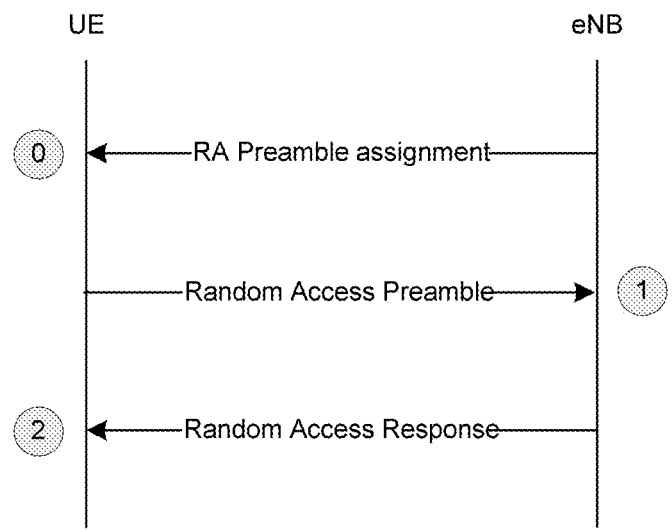
FIG. 6 is a reproduction of FIG. 10.1.5.2-1 of 3GPP TS 36.300 v13.2.0.
Figure 10:
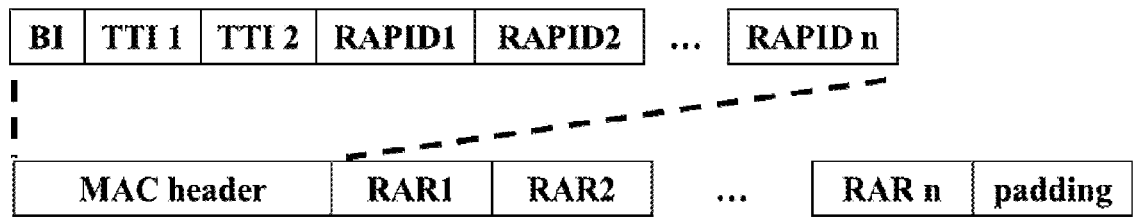
FIG. 10 is a diagram according to one exemplary embodiment.

The non-contention based random access procedure is outlined on FIG. 10.1.5.2-1 below:

[FIG. 10.1.5.2-1 of 3GPP TS 36.300 v13.2.0 is reproduced as FIG. 6]

The three steps of the non-contention based random access procedures are:

0) Random Access Preamble assignment via dedicated signalling in DL:
    eNB assigns to UE a non-contention Random Access Preamble (a Random Access Preamble not within the set sent in broadcast signalling).
    Signalled via:
        HO command generated by target eNB and sent via source eNB for handover;
        PDCCH in case of DL data arrival or positioning;
        PDCCH for initial UL time alignment for a STAG.
1) Random Access Preamble on RACH in uplink:
    UE transmits the assigned non-contention Random Access Preamble.
2) Random Access Response on DL-SCH:
    Semi-synchronous (within a flexible window of which the size is two or more TTIs) with message 1;
    No HARQ;
    Addressed to RA-RNTI on PDCCH;
    Conveys at least:
        Timing Alignment information and initial UL grant for handover;
        Timing Alignment information for DL data arrival;
        RA-preamble identifier;
        Intended for one or multiple UEs in one DL-SCH message.

When performing non-contention based random access on the PCell while CA is configured, the Random Access Preamble assignment via PDCCH of step 0, step 1 and 2 of the non-contention based random access procedure occur on the PCell. In order to establish timing advance for a sTAG, the eNB may initiate a non-contention based random access procedure with a PDCCH order (step 0) that is sent on a scheduling cell of activated SCell of the sTAG. Preamble transmission (step 1) is on the indicated SCell and Random Access Response (step 2) takes place on PCell.

When performing non-contention based random access on the PCell or PSCell while DC is configured, the Random Access Preamble assignment via PDCCH of step 0, step 1 and 2 of the non-contention based random access procedure occur on the corresponding cell. In order to establish timing advance for a sTAG, the eNB may initiate a non-contention based random access procedure with a PDCCH order (step 0) that is sent on a scheduling cell of activated SCell of the sTAG not including PSCell. Preamble transmission (step 1) is on the indicated SCell and Random Access Response (step 2) takes place on PCell for MCG and PSCell for SCG.

Details of each random access step and related control element are described in Sections 5.1, 5.4, 6, and 7 of 3GPP TS 36.321. Furthermore, some configurations for random access and obtaining procedure are discussed in 3GPP 36.331.

One NR requirement listed in 3GPP TR 38.913 lists the following NR requirement: "Control plane latency refers to the time to move from a battery efficient state (e.g., IDLE) to start of continuous data transfer (e.g., ACTIVE). The target for control plane latency should be 10 ms." Regarding similar requirement in LTE, the control plane latency requirement is set to 50 ms (as discussed in 3GPP TS 36.913). There is a huge gap between latency requirement of LTE and latency requirement of NR. Therefore, it would be better to reduce possible transmission and processing latency as much as possible. As discussed below, the present application first focuses on random access latency.

In LTE, there are two kinds of random access procedure, contention and non-contention. The contention random access procedure consists of 4 steps, including: Msg1, Msg2, Msg3, and Msg4. FIG. 5 is an exemplary embodiment for the contention random access. The Msg1 and Msg3 are transmitted from a UE to a network. And the resource for performing Msg1 transmission and Msg3 transmission are contention resource. If the network can successfully receive a Msg3, the network could identify the UE based on contents in Msg3, and transmit a Msg4 to the UE for finishing the contention.

On the other hand, a dynamic TTI adjusting concept is discussed in 3GPP R2-163445, which proposes to set the TTI size per scheduling grant for optimizing TCP (Transmission Control Protocol) transmission case. In particular, short TTI can be used to accelerate TCP slow start process, and long TTI can be used in steady transmission rate state for reduce control signaling overhead.

Considering such dynamic TTI concept, the present application further discusses whether it can also be used to accelerate random access procedure and how to achieve dynamic TTI change in random access. The following discussion mainly focuses on the Msg3 transmission step in a random access procedure. In addition, the discussion below does not include UE's RF/Baseband capability differentiation (e.g., differentiation between normal cell phone in LTE and NB-IoT devices in LTE) case.

In LTE, there could be three different random access configurations in LTE system. The first configuration is generally for normal UEs with enough RF/Baseband capability to monitor whole system bandwidth (e.g., cell phones, high end MTC devices). The second configuration is generally for low-end MTC devices and normal UEs with enough RF/Baseband capability but worked in power limited condition. The third configuration is generally for NB-IoT (Narrow Band-Internet of Thing) UEs which pool RF/Baseband capability and can only perform transmission/ reception on a narrow band (e.g., 1.4 MHz). The last configuration is generally defined as a new RAT (Radio Access Technology). Normally, low-end MTC devices will only worked on the second configuration, and NB-IoT devices will work only on the third configuration. For a normal UE with enough RF/Baseband capability, the UE will only change RA configuration when it enters the power limited state (e.g., cell edge or even far away).

Figure 7:
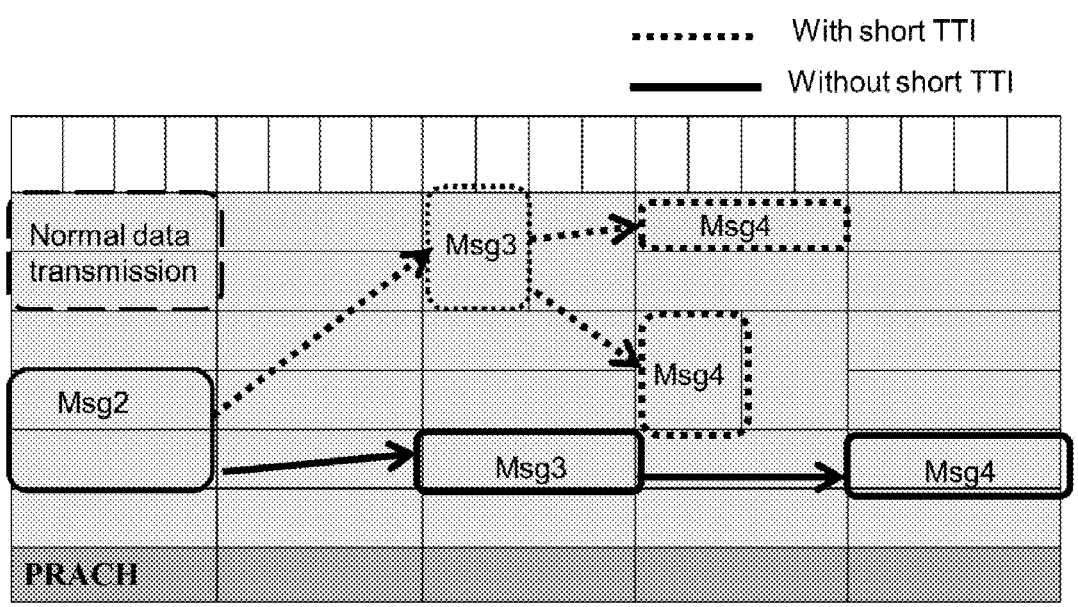
FIG. 7 is a diagram according to one exemplary embodiment.

If short TTI applies to Msg3 transmission, the average random access latency could be reduced due to early start to monitor Msg4. A possible case for such benefit is shown in FIG. 7. As shown in FIG. 7, although the processing delay is a fixed period, the UE could start to receive Msg4 earlier owing to early Msg3 transmission. Moreover, two possibilities for monitoring Msg4 are shown in FIG. 7. The UE may expect either TTI format if the TTI length information is not be carried in scheduling control signal. Otherwise, the UE may expect multiple possibilities of TTI length.

Another possible benefit may be improving resource efficiency. If the dynamic TTI concept is applied to Msg3, the network can more flexibly adjust resource allocation. In LTE, the TTI length for Msg3 is fixed. In the same modulation scheme condition, LTE system could only schedule radio resource in PRB level, while NR may be able to schedule in symbol level.

To achieve dynamic TTI concept, a UE needs to derive TTI information (e.g., TTI length, numerology) for transmitting Msg3 on air interface. In this aspect, possible candidates for the UE are proposed to obtain such information. One or multiple solutions can be applied in a NR system.

Figure 8:
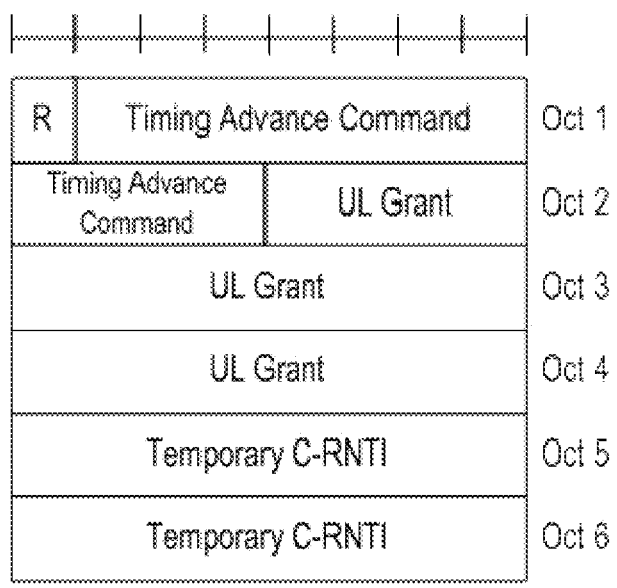
FIG. 8 is a diagram according to one exemplary embodiment.

Solution 1—RAR (Random Access Response). In LTE, Msg3 transmission is scheduled by UL grant field in RAR. A RAR is a response for a preamble transmitted at a Msg1 transmission opportunity from UE(s). The format of RAR in LTE is shown in FIG. 8.

Figure 9:
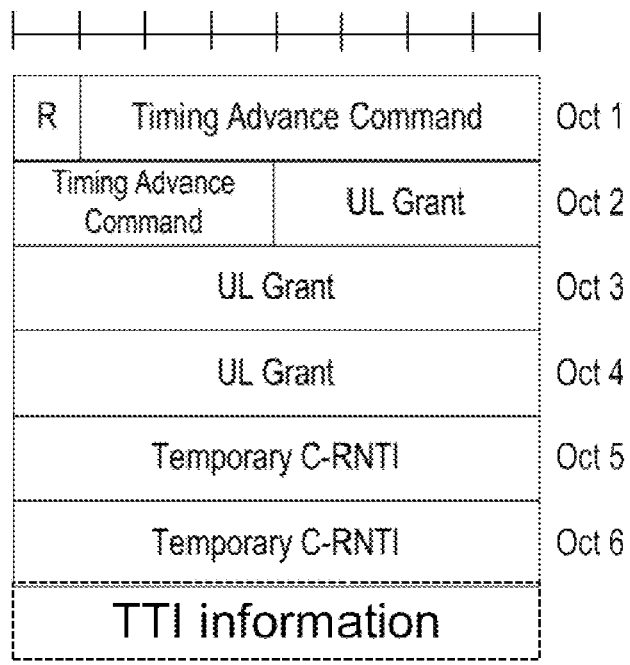
FIG. 9 is a diagram according to one exemplary embodiment.

The Msg3 transmission is scheduled according to UL (Uplink) grant field in the RAR. In this solution, additional TTI information is added into RAR for scheduling Msg3. In one embodiment, the new TTI information can be a new field in RAR or a new field in Msg2 for a specific preamble or added into UL grant field. A possible exemplary embodiment is shown in FIG. 9.

Solution 2—Common field in Msg2. In Solution 2, the TTI information is also carried in Msg2 similar to Solution 1. The Msg2 may include multiple RARs. And sub-header of a RAR will indicate the RAR is for which preamble. However, since the TTI length has limited choices, there may be no need to repeatedly include the redundant information. Hence, it is proposed to use common field(s) in Msg2 to carry TTI information. A possible example is shown in FIG. 10. The TTI information 1 could be provided to preamble set 1 (e.g., rapid 0~20), and the TTI information 2 could be provided to preamble set 2 (e.g., rapid 21~40).

The TTI information carried in a common field will be applied to UEs performed different Msg1 transmission (e.g., different preamble). The different Msg1 transmissions are differentiable by receiving side in Code domain and/or Time domain and/or Frequency domain. Preferably, the common field(s) may be carried as control element. Alternatively, the common field(s) may be carried as part of MAC (sub-) header, as data (e.g., RRC configuration), or in control signal (e.g., PDCCH signal) for scheduling Msg2.

If multiple common fields are included in a Msg2, a UE could select one of them to apply to Msg3 transmission. In one embodiment, the UE could select common field based on its Msg1 transmission (e.g., preamble group set in RA configuration used by Msg1, PRACH resource set in RA configuration used by Msg1, Msg1 length or format, RA configuration used by Msg1, etc.). The UE could also select common field based on service types (e.g., URLLC, eMBB, delay sensitive, . . . ). For example, if the UE triggers RA for transmitting a specific service type data (e.g., URLLC service type), then the UE could select common field for the specific service type. Moreover, the UE may understand the data belonging to which service type based on a service type indication (similar to logical channel priority) in configuration of logical channel/RB having available data. The service type indication may be used in multiplexing procedure. For instance, the UE may not multiplex data with different service type indications into a TB for transmission. Alternatively, the UE may understand the data belonging to which service type based on header field of the data (e.g., RLC header field, PDCP field), or based on delivering user plane protocol type/category (e.g., category 1 maps to URLLC). As an example, if the UE triggers RA when the UE has registered/authorized for URLLC service type, the UE could select common field for URLLC service type. As another example, if higher layer (e.g., NAS layer, application layer, RRC layer) in a UE sends a service indication to lower layer (e.g., MAC, PHY) in the UE when the UE triggers and/or performs RA, the UE could select common field based on the service type indicated by the service indication.

In one embodiment, the UE selects common field based on random access purpose (e.g., request system information, paging, positioning, location update, control plane establishment, beam recovery, etc.). And the random access purpose may be indicated by higher layer (e.g. NAS, RRC, application layer) in the UE.

In one embodiment, the UE selects common field based on potential Msg3 size. For example, if the pending available data in a UE larger than a threshold when a UE is performing RA, the UE selects common field for potential message size larger than the threshold.

In one embodiment, the UE selects common field based on its DL measurement, based on connection establishment cause (e.g., emergency call, mo-data, mt-data, . . . ), based on its current power ramping result (e.g., ramping over threshold times or threshold power, changing based on mapping table between ramping steps and TTI information), based on UE priority (e.g., access class, etc.) provided from network or UE subscription, or based on Msg3 contents (e.g., which type control element could be included, BSR reporting for which LCG or which RB/LC, data from which user plane protocol stock, data from which radio bearer, data from which logical channel, . . . ). For example, if Msg3 could include data from a specific (set of) LC or RB (e.g. URLLC type RB, CCCH, . . . ), the UE could select common field related to the LC or RB based on the UE's configuration (e.g., association between LC/RB and random access configuration, association between LC/RB and service configuration, association between LC/RB and transport channel configuration, etc). As another example, if Msg3 could include a special control element/special message, the UE could select common field related to the special control element/message. Preferably, the UE will select another common field if the Msg3 doesn't include the special control element and/or the special message (e.g., RRC message).

In one embodiment, the UE selects common field based on highest priority of radio bearers having available data. For example, if the UE has available data belonging to radio bearer with priority 2 and priority 8 when the UE is performing RA. The UE could select common field based on whether priority 2 is over a threshold or not.

In one embodiment, the UE selects common field based on highest priority of logical channels having available data, or based on which user plane protocol stock (e.g., URLLC or eMBB type user plane protocol, protocol stock category/index 1 or 2, . . . ) performing the random access.

Solution 3—Broadcast Information. In Solution 3, a UE could derive TTI length for Msg3 transmission through a broadcast message (e.g., system information(s), MIB, etc.) from a network (e.g., gNB, base station, TRP, etc.). If multiple TTI information for Msg3 transmission are included in the broadcast message, a UE could select one of them to apply to Msg3 transmission.

In one embodiment, the UE selects TTI information in the broadcast message based on its Msg1 transmission (e.g., preamble group set in RA configuration used by Msg1, PRACH resource set in RA configuration used by Msg1, Msg1 length or format, RA configuration used by Msg1, etc.). For example, if the UE triggers RA for transmitting a specific service type data (e.g., URLLC service type), then the UE could select TTI information in the broadcast message for the specific service type. Moreover, the UE may understand the data belonging to which service type based on a service type indication (similar to logical channel priority) in configuration of logical channel/RB having available data.

The service type indication may be used in multiplexing procedure. For instance, the UE may not multiplex data with different service type indications into a TB for transmission. Alternatively, the UE may understand the data belonging to which service type based on header field of the data (e.g., RLC header field, PDCP field). The UE may also understand the data belonging to which service type based on delivering user plane protocol type/category (e.g., category 1 maps to URLLC). As another example, if the UE triggers RA when the UE has registered/authorized for URLLC service type, the UE could select TTI information in the broadcast message for URLLC service type. As a further example, if higher layer (e.g., NAS layer, application layer, RRC layer) in a UE sends a service indication to lower layer (e.g., MAC, PHY) in the UE when the UE triggers and/or performs RA, the UE could select TTI information in the broadcast message based on the service type indicated by the service indication.

In one embodiment, the UE selects TTI information in the broadcast message based on random access purpose (e.g., request broadcast message, paging, positioning, location update, control plane establishment, beam recovery, etc.). And the random access purpose may be indicated by higher layer (e.g., NAS, RRC, application layer) in the UE.

In one embodiment, the UE selects TTI information in the broadcast message based on potential Msg3 size. For example, if the pending available data in the UE larger than a threshold when the UE is performing RA, the UE selects TTI information in the broadcast message for potential message size larger than the threshold.

In one embodiment, the UE selects TTI information in the broadcast message based on its DL measurement, based on connection establishment cause (e.g., emergency call, mo-data, mt-data, . . . ), based on its current power ramping result (e.g., ramping over threshold times or threshold power, changing based on mapping table between ramping steps and TTI information), based on UE priority provided from network or UE subscription (e.g., access class, etc.), or based on Msg3 contents (e.g., which type control element could be included, BSR reporting for which LCG or which RB/LC, data from which user plane protocol stock, data from which radio bearer, data from which logical channel, . . . ). For example, if Msg3 could include data from a specific or a set of LC or RB (e.g., URLLC type RB, CCCH, . . . ), the UE could select TTI information in the broadcast message related to the LC or RB based on the UE's configuration. As another example, if Msg3 could include a special control element/special message, the UE could select TTI information in the broadcast message related to the special control element/message. Preferably, the UE will select another TTI information if the Msg3 doesn't include the special control element and/or the special message (e.g., RRC message).

In one embodiment, the UE selects TTI information in the broadcast message based on highest priority of radio bearers having available data. For example, the UE has available data belonging to radio bearer with priority 2 and priority 8 when the UE is performing RA. The UE could select TTI information in the broadcast message based on whether priority 2 is over a threshold or not.

In one embodiment, the UE selects TTI information in the broadcast message based on highest priority of logical channels having available data, or based on which user plane protocol stock (e.g., URLLC or eMBB type user plane protocol, protocol stock category/index 1 or 2, . . . ) performing the random access.

Solution 4—Dedicated message. In Solution 4, a UE could derive TTI length for Msg3 transmission through a dedicated message (e.g., RRC reconfiguration message, paging message, PDCCH for initiating RA, . . . ) from a network. If multiple TTI information for Msg3 transmission are (implicitly or explicitly) included in the dedicated message, a UE could select one of them to apply to Msg3 transmission.

In one embodiment, the UE selects TTI information in dedicated message based on its Msg1 transmission (e.g., preamble group set in RA configuration used by Msg1, PRACH resource set in RA configuration used by Msg1, Msg1 length or format, RA configuration used by Msg1, etc.). For example, if the UE triggers RA for transmitting a specific service type data (e.g., URLLC service type), then the UE could select TTI information in dedicated message for the specific service type. Moreover, the UE may understand the data belonging to which service type based on a service type indication (similar to logical channel priority) in configuration of logical channel/RB having available data. The service type indication may be used in multiplexing procedure. For instance, the UE may not multiplex data with different service type indications into a TB for transmission. Alternatively, the UE may understand the data belonging to which service type based on header field of the data (e.g., RLC header field, PDCP field)), or based on delivering user plane protocol type/category (e.g., category 1 maps to URLLC).

As another example, if the UE triggers RA when the UE has registered/authorized for URLLC service type, the UE could select TTI information in the dedicated message for URLLC service type. As a further example, if higher layer (e.g., NAS layer, application layer, RRC layer) in the UE sends a service indication to lower layer(e.g., MAC, PHY) in the UE when the UE triggers and/or performs RA, the UE could select TTI information in the dedicated message based on the service type indicated by the service indication.

In one embodiment, the UE selects TTI information in the dedicated message based on random access purpose (e.g., request system information, paging, positioning, location update, control plane establishment, beam recovery, etc.). And the random access purpose may be indicated by higher layer (e.g., NAS, RRC, application layer) in the UE.

In one embodiment, the UE selects TTI information in the dedicated message based on potential Msg3 size. For example, if the pending available data in the UE larger than a threshold when the UE is performing RA, the UE selects TTI information in the dedicated message for potential message size larger than the threshold.

In one embodiment, the UE selects TTI information in the dedicated message based on its DL measurement, based on connection establishment cause (e.g., emergency call, mo-data, mt-data, . . . ), based on its current power ramping result (e.g., ramping over threshold times or threshold power, changing based on mapping table between ramping steps and TTI information), based on UE priority provided from network or UE subscription (e.g., access class, etc.), or based on Msg3 contents (e.g., which type control element could be included, BSR reporting for which LCG or which RB/LC, data from which user plane protocol stock, data from which radio bearer, data from which logical channel, . . . ). For example, if Msg3 could include data from a specific (set of) LC or RB (e.g. URLLC type RB, CCCH, . . . ), the UE could select TTI information in dedicated message related to the LC or RB based on the UE's configuration. As another example, if Msg3 could include a special control element/special message, the UE could select TTI information in the dedicated message related to the special control element/message. Preferably, the UE will select another TTI information if the Msg3 doesn't include the special control element and/or the special message (e.g., RRC message).

In one embodiment, the UE selects TTI information in the dedicated message based on highest priority of radio bearers having available data. For example, the UE has available data belonging to radio bearer with priority 2 and priority 8 when the UE is performing RA. The UE could select TTI information in dedicated message based on whether priority 2 is over a threshold or not.

In one embodiment, the UE selects TTI information in the dedicated message based on highest priority of logical channels having available data, or based on which user plane protocol stock (e.g., URLLC or eMBB type user plane protocol, protocol stock category/index 1 or 2, . . . ) performing the random access.

Solution 5—Implicitly derive from Msg2 Transmission. In this solution, a UE could derive TTI length for Msg3 transmission based on implicit information of Msg2. In one embodiment, a UE derives TTI length based on TTI length used by Msg2. The TTI duration of Msg3 transmission may be N times of TTI duration of Msg2. N value can be integer or decimal. The N value may be obtained by the UE based on one or multiple solutions mentioned above. For example, the UE may obtain the N value through the broadcast message from a network. And the UE could overwrite the N value provided in the broadcast message, if the UE receives another N value in a dedicated message.

In another embodiment, a UE derives TTI length based on frequency carrier used by Msg2. Each frequency carrier may have corresponding different TTI lengths. The corresponding TTI information may be predefined and/or provided through system information and/or dedicated RRC message.

Figure 11:
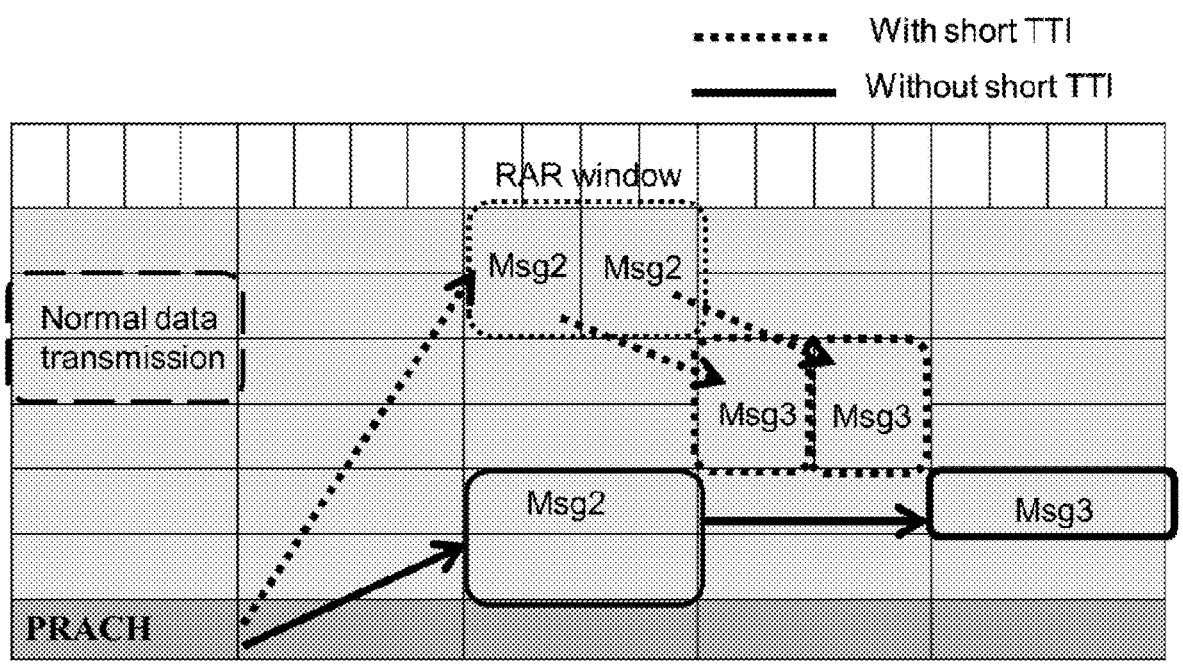
FIG. 11 is a diagram according to one exemplary embodiment.

Msg3 start timing offset—In LTE, there is a fixed gap period between Msg2 reception and Msg3 transmission. The fixed gap period is designed for covering UE's Msg2/3 processing time (e.g., decode, (de-)multiplexing transport block). However, in NR, some possible methods can bring benefits to reduce such fixed gap period. For example, if short TTI is applied to both Msg2/Msg3 transmissions as FIG. 11, the minimum of the fixed gap between Msg2 and Msg3 can be set to short TTI. Otherwise, the minimum gap could only be set to normal sub-frame length like without short TTI case.

There are also many other ways to reduce processing time (e.g., provision TB size). These methods will bring some benefits, as well as some limitations and/or complexity. As a conclusion, we think that it could be beneficial for network be capable to decide the length of gap period. For achieving the concept, a UE will need to know the gap information (or called Msg3 start timing offset) by information provided from network. The possible solutions are listed below.

Solution 1—RAR (Random Access Response). In LTE, Msg3 transmission is scheduled by UL grant field in RAR. A RAR is a response for a preamble transmitted at a Msg1 transmission opportunity from UE(s). The format of RAR in LTE is shown in FIG. 8.

The Msg3 transmission is scheduled according to UL (Uplink) grant field in the RAR. In this solution, additional information is added into RAR for adjusting Msg3 start timing offset. In one embodiment, the additional information can be a new field in RAR or a new field in Msg2 for a specific preamble or added into UL grant field.

Solution 2—Common field in Msg2. In Solution 2, the Msg3 start timing offset is also carried in Msg2 similar to Solution 1. The Msg2 may include multiple RARs. And MAC sub-header of a RAR will indicate the RAR is for which preamble. However, since the TTI length has limited choices, there may be no need to repeatedly include the redundant information. Hence, it is proposed to use common field(s) in Msg2 to carry Msg3 start timing offset.

The Msg3 start timing offset carried in a common field will be applied to UEs performed different Msg1 transmission (e.g., different preamble). The different Msg1 transmissions are differentiable by receiving side in Code domain and/or Time domain and/or Frequency domain. Preferably, the common field(s) may be carried as control element. Alternatively, the common field(s) may be carried as part of MAC (sub-)header, as data (e.g., RRC configuration), or in control signal (e.g., PDCCH signal) for scheduling Msg2.

If multiple common fields are included in a Msg2, a UE could select one of them to apply to Msg3 transmission. In one embodiment, the UE could select common field based on its Msg1 transmission (e.g., preamble group set in RA configuration used by Msg1, PRACH resource set in RA configuration used by Msg1, Msg1 length or format, RA configuration used by Msg1, etc.). The UE could also select common field based on service types (e.g., URLLC, eMBB, delay sensitive, . . . ). For example, if the UE triggers RA for transmitting a specific service type data (e.g., URLLC service type), then the UE could select common field for the specific service type. Moreover, the UE may understand the data belonging to which service type based on a service type indication (similar to logical channel priority) in configuration of logical channel/RB having available data. The service type indication may be used in multiplexing procedure. For instance, the UE may not multiplex data with different service type indications into a TB for transmission.

Alternatively, the UE may understand the data belonging to which service type based on header field of the data (e.g., RLC header field, PDCP field), or based on delivering user plane protocol type/category (e.g., category 1 maps to URLLC). As an example, if the UE triggers RA when the UE has registered/authorized for URLLC service type, the UE could select common field for URLLC service type. As another example, if higher layer (e.g., NAS layer, application layer, RRC layer) in a UE sends a service indication to lower layer (e.g., MAC, PHY) in the UE when the UE triggers and/or performs RA, the UE could select common field based on the service type indicated by the service indication.

In one embodiment, the UE selects common field based on random access purpose (e.g., request system information, paging, positioning, location update, control plane establishment, beam recovery, etc.). And the random access purpose may be indicated by higher layer (e.g., NAS, RRC, application layer) in the UE.

In one embodiment, the UE selects common field based on potential Msg3 size. For example, if the pending available data in a UE larger than a threshold when a UE is performing RA, the UE selects common field for potential message size larger than the threshold.

In one embodiment, the UE selects common field based on its DL measurement, based on connection establishment cause (e.g., emergency call, mo-data, mt-data, . . . ), based on its current power ramping result (e.g., ramping over threshold times or threshold power, changing based on mapping table between ramping steps and Msg3 start timing offset), based on UE priority (e.g., access class, etc.) provided from network or UE subscription, or based on Msg3 contents (e.g., which type control element could be included, BSR reporting for which LCG or which RB/LC, data from which user plane protocol stock, data from which radio bearer, data from which logical channel, . . . ). For example, if Msg3 could include data from a specific (set of) LC or RB (e.g. URLLC type RB, CCCH, . . . ), the UE could select common field related to the LC or RB based on the UE's configuration (e.g., association between LC/RB and random access configuration, association between LC/RB and service configuration, association between LC/RB and transport channel configuration, etc.). As another example, if Msg3 could include a special control element/special message, the UE could select common field related to the special control element/message. Preferably, the UE will select another common field if the Msg3 doesn't include the special control element and/or the special message (e.g., RRC message).

In one embodiment, the UE selects common field based on highest priority of radio bearers having available data. For example, the UE has available data belonging to radio bearer with priority 2 and priority 8 when the UE is performing RA. The UE could select common field based on whether priority 2 is over a threshold or not.

In one embodiment, the UE selects common field based on highest priority of logical channels having available data, or based on which user plane protocol stock (e.g., URLLC or eMBB type user plane protocol, protocol stock category/index 1 or 2, . . . ) performing the random access.

Solution 3—Broadcast Information. In Solution 3, a UE could derive Msg3 start timing offset for Msg3 transmission through a broadcast message (e.g., system information(s), MIB, etc.) from a network (e.g., gNB, base station, TRP, etc.). If multiple Msg3 start timing offsets for Msg3 transmission are included in the broadcast message, a UE could select one of them to apply to Msg3 transmission.

In one embodiment, the UE selects Msg3 start timing offsets in the broadcast message based on its Msg1 transmission (e.g., preamble group set in RA configuration used by Msg1, PRACH resource set in RA configuration used by Msg1, Msg1 length or format, RA configuration used by Msg1, etc.), or based on service types (e.g., URLLC, eMBB, delay sensitive, . . . ). For example, if the UE triggers RA for transmitting a specific service type data (e.g., URLLC service type), then the UE could select Msg3 start timing offset in the broadcast message for the specific service type.

Moreover, the UE may understand the data belonging to which service type based on a service type indication (similar to logical channel priority) in configuration of logical channel/RB having available data.

The service type indication may be used in multiplexing procedure. For instance, the UE may not multiplex data with different service type indications into a TB for transmission. Alternatively, the UE may understand the data belonging to which service type based on header field of the data (e.g., RLC header field, PDCP field). The UE may also understand the data belonging to which service type based on delivering user plane protocol type/category (e.g., category 1 maps to URLLC). As another example, if the UE triggers RA when the UE has registered/authorized for URLLC service type, the UE could select Msg3 start timing offset in the broadcast message for URLLC service type. As a further example, if higher layer (e.g., NAS layer, application layer, RRC layer) in a UE sends a service indication to lower layer(e.g., MAC, PHY) in the UE when the UE triggers and/or performs RA, the UE could select Msg3 start timing offset in the broadcast message based on the service type indicated by the service indication.

In one embodiment, the UE selects Msg3 start timing offset in the broadcast message based on random access purpose (e.g., request broadcast message, paging, positioning, location update, control plane establishment, beam recovery, etc.). And the random access purpose may be indicated by higher layer (e.g., NAS, RRC, application layer) in the UE.

In one embodiment, the UE selects Msg3 start timing offset in the broadcast message based on potential Msg3 size. For example, if the pending available data in the UE larger than a threshold when the UE is performing RA, the UE selects Msg3 start timing offset in the broadcast message for potential message size larger than the threshold.

In one embodiment, the UE selects Msg3 start timing offset in the broadcast message based on its DL measurement, based on connection establishment cause (e.g., emergency call, mo-data, mt-data, . . . ), based on its current power ramping result (e.g., ramping over threshold times or threshold power, changing based on mapping table between ramping steps and Msg3 start timing offset), based on UE priority provided from network or UE subscription (e.g., access class, etc.), or based on Msg3 contents (e.g., which type control element could be included, BSR reporting for which LCG or which RB/LC, data from which user plane protocol stock, data from which radio bearer, data from which logical channel, . . . ). For example, if Msg3 could include data from a specific or a set of LC or RB (e.g., URLLC type RB, CCCH, . . . ), the UE could select Msg3 start timing offset in the broadcast message related to the LC or RB based on the UE's configuration. As another example, if Msg3 could include a special control element/special message, the UE could select Msg3 start timing offset in the broadcast message related to the special control element/message. Preferably, the UE will select another Msg3 start timing offset if the Msg3 doesn't include the special control element and/or the special message (e.g., RRC message).

In one embodiment, the UE selects Msg3 start timing offset in the broadcast message based on highest priority of radio bearers having available data. For example, the UE has available data belonging to radio bearer with priority 2 and priority 8 when the UE is performing RA. The UE could select Msg3 start timing offset in the broadcast message based on whether priority 2 is over a threshold or not.

In one embodiment, the UE selects Msg3 start timing offset in the broadcast message based on highest priority of logical channels having available data, or based on which user plane protocol stock (e.g., URLLC or eMBB type user plane protocol, protocol stock category/index 1 or 2, . . . ) performing the random access.

Solution 4—Dedicated message. In Solution 4, a UE could derive Msg3 start timing offset for Msg3 transmission through a dedicated message (e.g., RRC reconfiguration message, paging message, PDCCH for initiating RA, . . . ) from a network. If multiple Msg3 start timing offsets for Msg3 transmission are (implicitly or explicitly) included in the dedicated message, a UE could select one of them to apply to Msg3 transmission.

In one embodiment, the UE selects Msg3 start timing offset in dedicated message based on its Msg1 transmission (e.g., preamble group set in RA configuration used by Msg1, PRACH resource set in RA configuration used by Msg1, Msg1 length or format, RA configuration used by Msg1, etc), or based on service types (e.g., URLLC, eMBB, delay sensitive, . . . ). For example, if the UE triggers RA for transmitting a specific service type data (e.g., URLLC service type), then the UE could select Msg3 start timing offset in dedicated message for the specific service type. Moreover, the UE may understand the data belonging to which service type based on a service type indication (similar to logical channel priority) in configuration of logical channel/RB having available data. The service type indication may be used in multiplexing procedure. For instance, the UE may not multiplex data with different service type indications into a TB for transmission. Alternatively, the UE may understand the data belonging to which service type based on header field of the data (e.g., RLC header field, PDCP field)), or based on delivering user plane protocol type/category (e.g., category 1 maps to URLLC).

As another example, if the UE triggers RA when the UE has registered/authorized for URLLC service type, the UE could select Msg3 start timing offset in the dedicated message for URLLC service type. As a further example, if higher layer (e.g., NAS layer, application layer, RRC layer) in the UE sends a service indication to lower layer (e.g., MAC, PHY) in the UE when the UE triggers and/or performs RA, the UE could select Msg3 start timing offset in the dedicated message based on the service type indicated by the service indication.

In one embodiment, the UE selects Msg3 start timing offset in the dedicated message based on random access purpose (e.g., request system information, paging, positioning, location update, control plane establishment, beam recovery, etc.). And the random access purpose may be indicated by higher layer (e.g., NAS, RRC, application layer) in the UE.

In one embodiment, the UE selects Msg3 start timing offset in the dedicated message based on potential Msg3 size. For example, if the pending available data in the UE larger than a threshold when the UE is performing RA, the UE selects Msg3 start timing offset in the dedicated message for potential message size larger than the threshold.

In one embodiment, the UE selects Msg3 start timing offset in the dedicated message based on its DL measurement, based on connection establishment cause (e.g., emergency call, mo-data, mt-data, . . . ), based on its current power ramping result (e.g., ramping over threshold times or threshold power, changing based on mapping table between ramping steps and Msg3 start timing offset), based on UE priority provided from network or UE subscription (e.g., access class, etc), or based on Msg3 contents (e.g., which type control element could be included, BSR reporting for which LCG or which RB/LC, data from which user plane protocol stock, data from which radio bearer, data from which logical channel, . . . ). For example, if Msg3 could include data from a specific (set of) LC or RB (e.g., URLLC type RB, CCCH, . . . ), the UE could select Msg3 start timing offset in dedicated message related to the LC or RB based on the UE's configuration. As another example, if Msg3 could include a special control element/special message, the UE could select Msg3 start timing offset in the dedicated message related to the special control element/message. Preferably, the UE will select another Msg3 start timing offset if the Msg3 doesn't include the special control element and/or the special message (e.g., RRC message).

In one embodiment, the UE selects Msg3 start timing offset in the dedicated message based on highest priority of radio bearers having available data. For example, the UE has available data belonging to radio bearer with priority 2 and priority 8 when the UE is performing RA. The UE could select Msg3 start timing offset in dedicated message based on whether priority 2 is over a threshold or not.

In one embodiment, the UE selects Msg3 start timing offset in the dedicated message based on highest priority of logical channels having available data, or based on which user plane protocol stock (e.g., URLLC or eMBB type user plane protocol, protocol stock category/index 1 or 2, . . . ) performing the random access.

Solution 5—Implicitly derive from Msg2 Transmission. In this solution, a UE could derive Msg3 start timing offset for Msg3 transmission based on implicit information of Msg2. In one embodiment, a UE derives Msg3 start timing offset based on start timing offset used by Msg2. The Msg3 start timing offset of Msg3 transmission may be N times of start timing offset of Msg2. N value can be integer or decimal. The N value may be obtained by the UE based on one or multiple solutions mentioned above. For example, the UE may obtain the N value through the broadcast message from a network. And the UE could overwrite the N value provided in the broadcast message, if the UE receives another N value in a dedicated message.

In another embodiment, a UE derives Msg3 start timing offset based on frequency carrier used by Msg2. Each frequency carrier may have corresponding different Msg3 start timing offsets. The corresponding Msg3 start timing offset may be predefined and/or provided through system information and/or dedicated RRC message.

The Msg3 start timing offset can be derived through the solution 1 to 5 mentioned above or combination of those solutions, while Msg3 start timing offset and TTI information of Msg3 can apply the same or different solutions. The Msg3 start timing offset can be indicated in TTI duration, numerology, symbol, slot, microsecond, millisecond or N times of periodicity of periodic behavior. N can be an integer or a decimal number.

Figure 12:
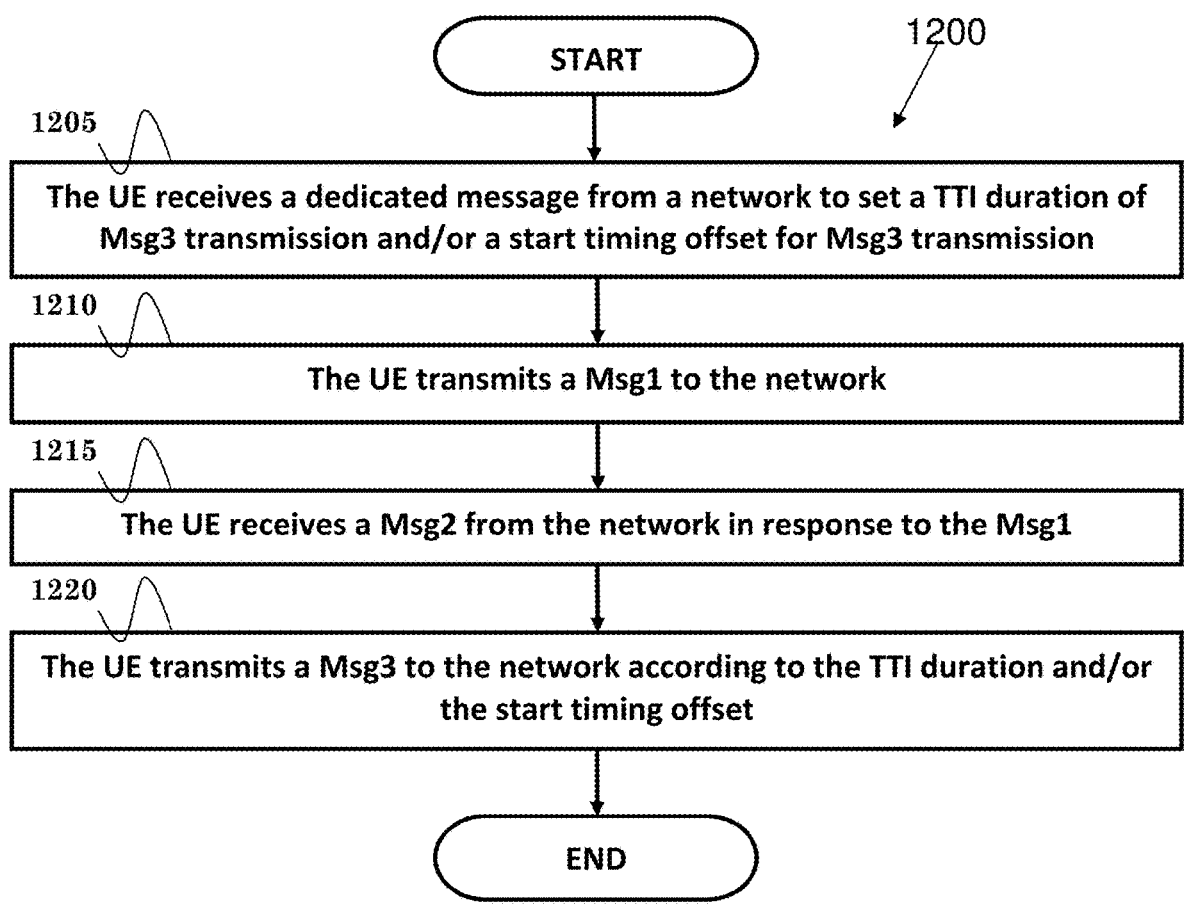
FIG. 12 is a flow chart according to one exemplary embodiment.

FIG. 12 is a flow chart 1200 according to one exemplary embodiment from the perspective of a UE. In step 1205, the UE receives a dedicated message from a network to set a TTI duration of Msg3 transmission and/or a start timing offset for Msg3 transmission. In step 1210, the UE transmits a Msg1 to the network. In step 1215, the UE receives a Msg2 from the network in response to the Msg1. In step 1220, the UE transmits a Msg3 to the network according to the TTI duration and/or the start timing offset.

Referring back to FIGS. 3 and 4, in one exemplary embodiment of a UE, the device 300 includes a program code 312 stored in the memory 310. The CPU 308 could execute program code 312 to enable the UE (i) to receive a dedicated message from a network to set a TTI duration of Msg3 transmission and/or a start timing offset for Msg3 transmission, (ii) to transmit a Msg1 to the network, (iii) to receive a Msg2 from the network in response to the Msg1, and (iv) to transmit a Msg3 to the network according to the TTI duration and/or the start timing offset. Furthermore, the CPU 308 can execute the program code 312 to perform all of the above-described actions and steps or others described herein.

Figure 13:
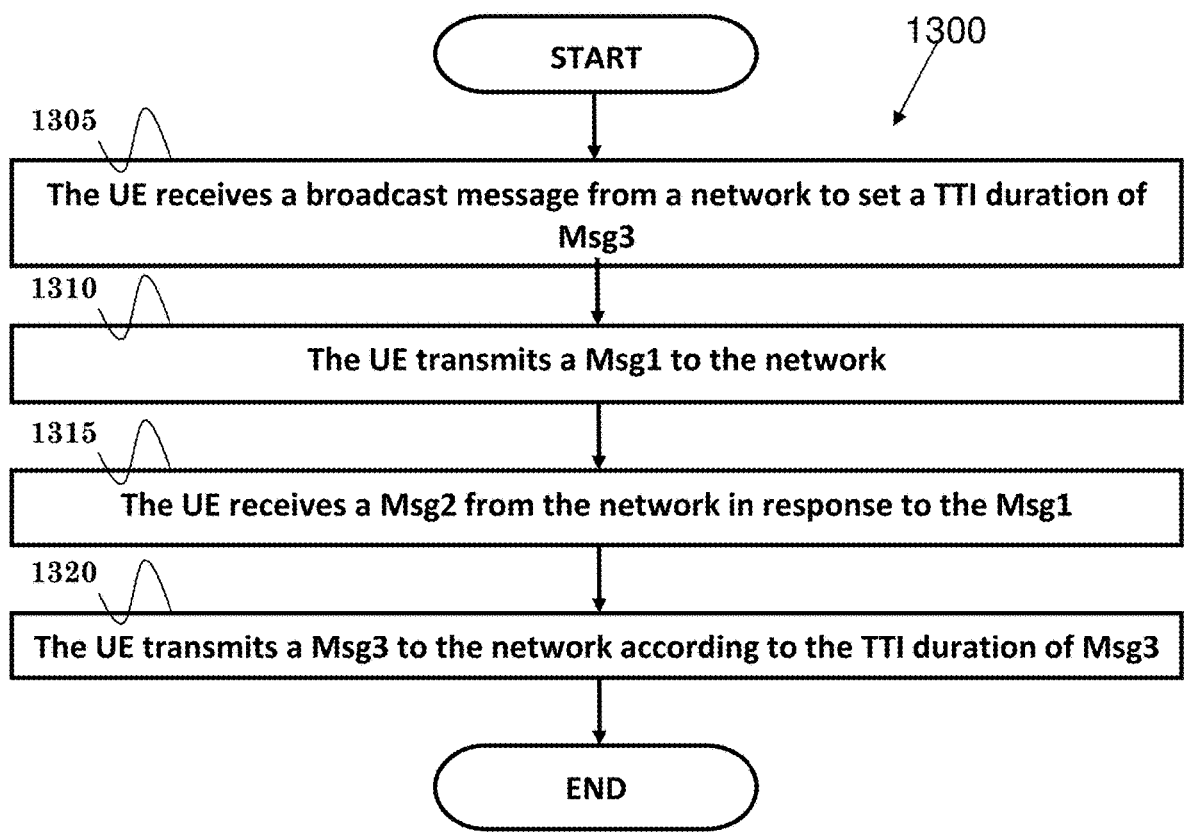
FIG. 13 is a flow chart according to one exemplary embodiment.

FIG. 13 is a flow chart 1300 according to one exemplary embodiment from the perspective of a UE. In step 1305, the UE receives a broadcast message from a network to set TTI duration of Msg3. In step 1310, the UE transmits a Msg1 to the network. In step 1315, the UE receives a Msg2 from the network in response to the Msg1. In step 1320, the UE transmits a Msg3 to the network according to the TTI duration of Msg3.

Referring back to FIGS. 3 and 4, in one exemplary embodiment of a UE, the device 300 includes a program code 312 stored in the memory 310. The CPU 308 could execute program code 312 to enable the UE (i) to receive a broadcast message from a network to set TTI duration of Msg3, (ii) to transmit a Msg1 to the network, (iii) to receive a Msg2 from the network in response to the Msg1, and (iv) to transmit a Msg3 to the network according to the TTI duration of Msg3. Furthermore, the CPU 308 can execute the program code 312 to perform all of the above-described actions and steps or others described herein.

Figure 14:
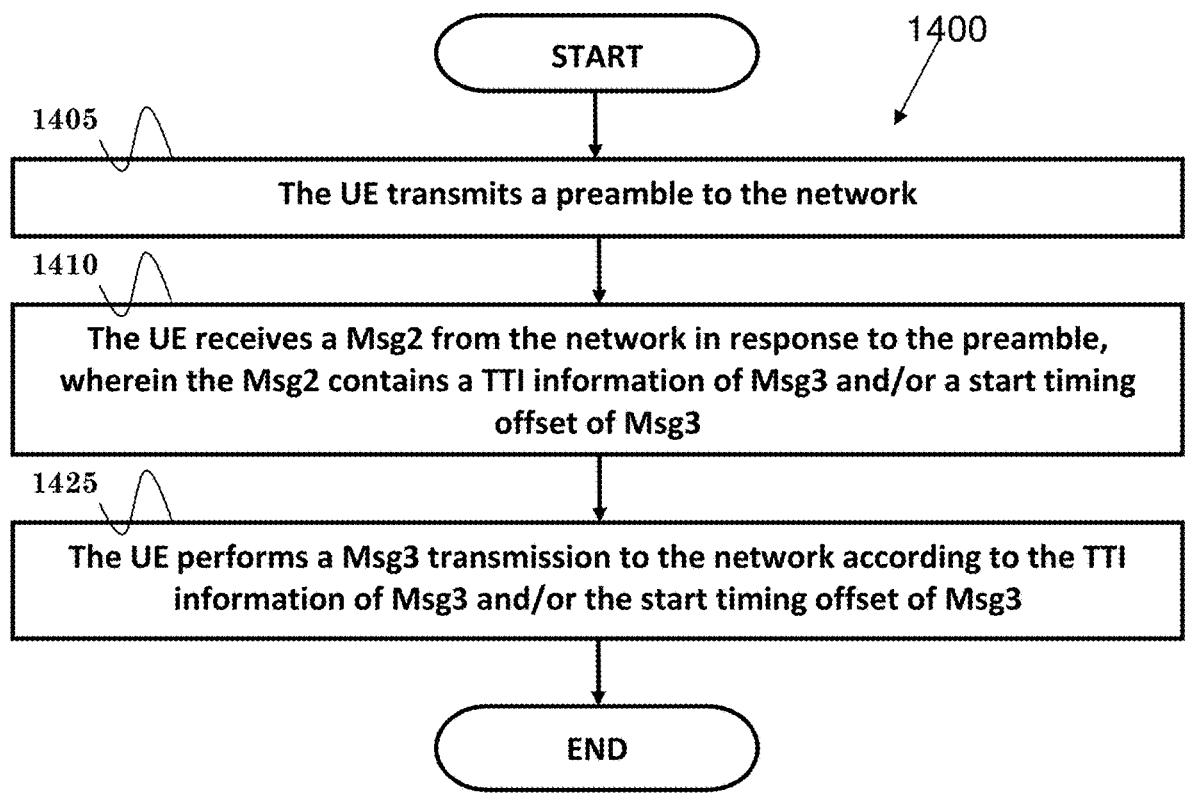
FIG. 14 is a flow chart according to one exemplary embodiment.

FIG. 14 is a flow chart 1400 according to one exemplary embodiment from the perspective of a UE. In step 1405, the UE transmits a preamble to a network. In step 1410, the UE receives a Msg2 from the network in response to the Msg1, wherein the Msg2 contains a TTI information of Msg3 transmission and/or a start timing offset of Msg3 transmission. In one embodiment, the TTI information of Msg3 transmission is indicated in a common field for multiple RARs in the Msg2. In another embodiment, the TTI information of Msg3 is indicated in a RAR in response to the Msg1 transmission. In one embodiment, the start timing offset of Msg3 is indicated in a common field for multiple RARs in the Msg2. In another embodiment, the start timing offset of Msg3 is indicated in a RAR in response to the Msg1 transmission. In step 1415, the UE transmits a Msg3 to the network according to the TTI information of Msg3 and/or the start timing offset of Msg3.

Referring back to FIGS. 3 and 4, in one exemplary embodiment of a UE, the device 300 includes a program code 312 stored in the memory 310. The CPU 308 could execute program code 312 to enable the UE (i) to transmit a preamble to a network, (ii) to receive a Msg2 from the network in response to the preamble, wherein the Msg2 contains a TTI duration of Msg3 transmission and/or a start timing offset of Msg3 transmission, and (iii) to perform a Msg3 transmission to the network according to the TTI information of Msg3 and/or the start timing offset of Msg3. Furthermore, the CPU 308 can execute the program code 312 to perform all of the above-described actions and steps or others described herein.

Figure 15:
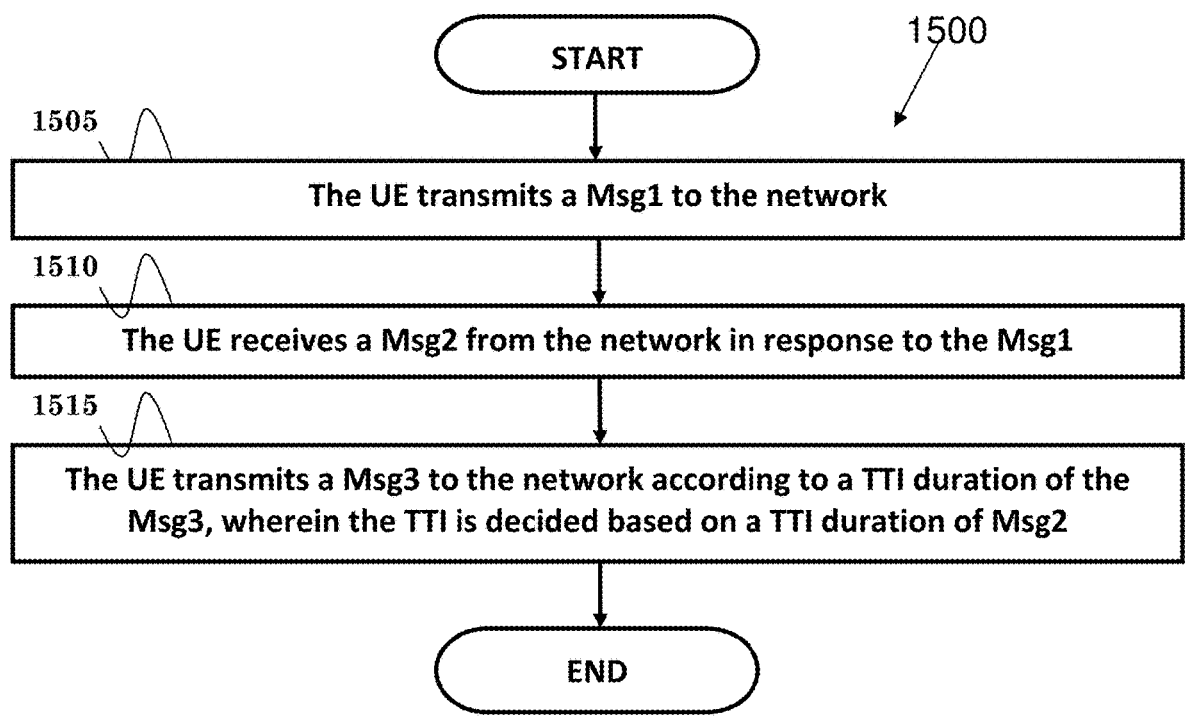
FIG. 15 is a flow chart according to one exemplary embodiment.

FIG. 15 is a flow chart 1500 according to one exemplary embodiment from the perspective of a UE. In step 1505, the UE transmits a Msg1 to a network. In step 1510, the UE receives a Msg2 from the network in response to the Msg1. In step 1515, the UE transmits a Msg3 to the network according to a TTI duration of the Msg3, wherein the TTI duration of the Msg3 is decided based on a TTI duration of Msg2.

Referring back to FIGS. 3 and 4, in one exemplary embodiment of a UE, the device 300 includes a program code 312 stored in the memory 310. The CPU 308 could execute program code 312 to enable the UE (i) to transmit a Msg1 to a network, (ii) to receive a Msg2 from the network in response to the Msg1, and (iii) to transmit a Msg3 to the network according to a TTI duration of the Msg3, wherein the TTI duration of the Msg3 is decided based on a TTI duration of Msg2. Furthermore, the CPU 308 can execute the program code 312 to perform all of the above-described actions and steps or others described herein.

Figure 16:
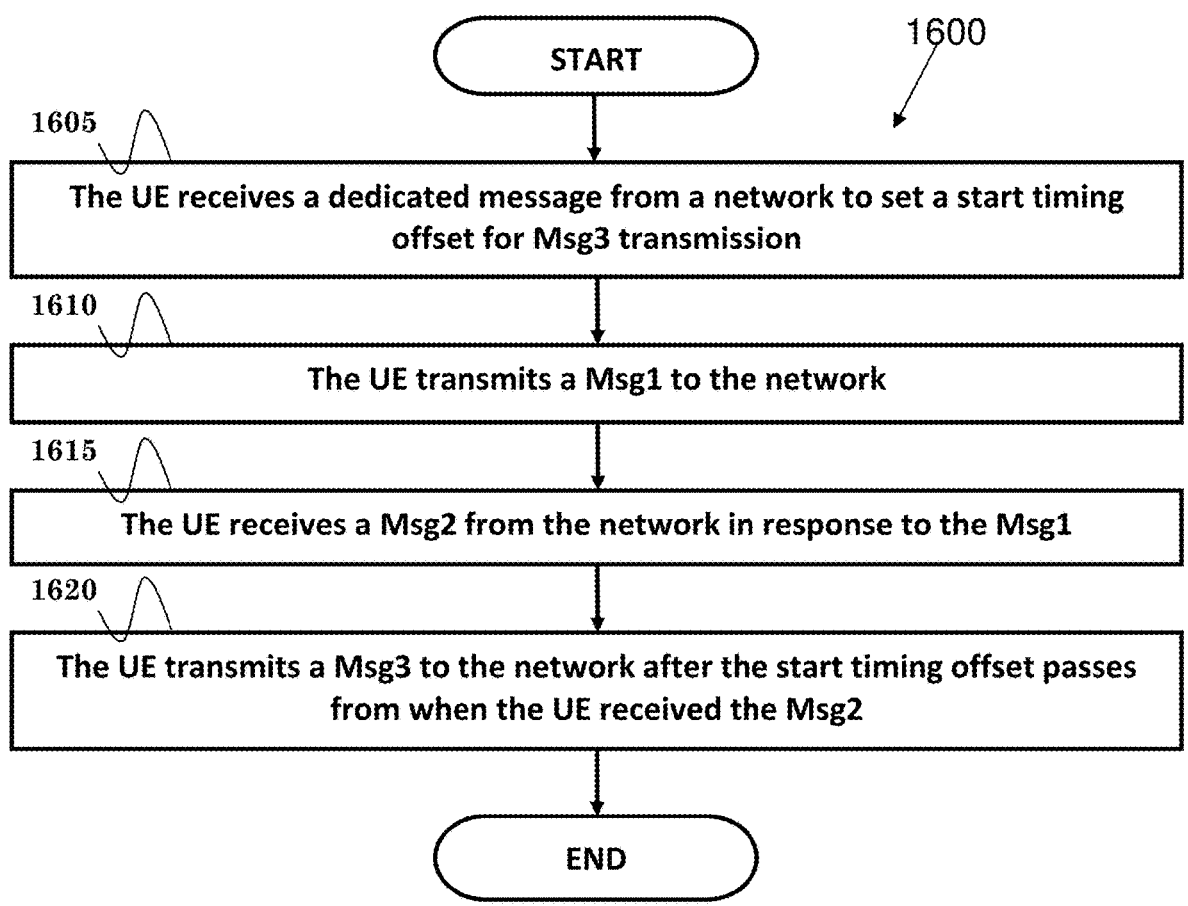
FIG. 16 is a flow chart according to one exemplary embodiment.

FIG. 16 is a flow chart 1600 according to one exemplary embodiment from the perspective of a UE. In step 1605, the UE receives a dedicated message from a network to set a start timing offset for Msg3 transmission. In step 1610, the UE transmits a Msg1 to the network. In step 1615, the UE receives a Msg2 from the network in response to the Msg1. In step 1620, the UE transmits a Msg3 to the network after the start timing offset passes from when the UE received the Msg2.

Referring back to FIGS. 3 and 4, in one exemplary embodiment of a UE, the device 300 includes a program code 312 stored in the memory 310. The CPU 308 could execute program code 312 to enable the UE (i) to receive a dedicated message from a network to set a start timing offset for Msg3 transmission, (ii) to transmit a Msg1 to the network, (iii) to receive a Msg2 from the network in response to the Msg1, and (iv) to transmit a Msg3 to the network after the start timing offset passes from when the UE received the Msg2. Furthermore, the CPU 308 can execute the program code 312 to perform all of the above-described actions and steps or others described herein.

Figure 17:
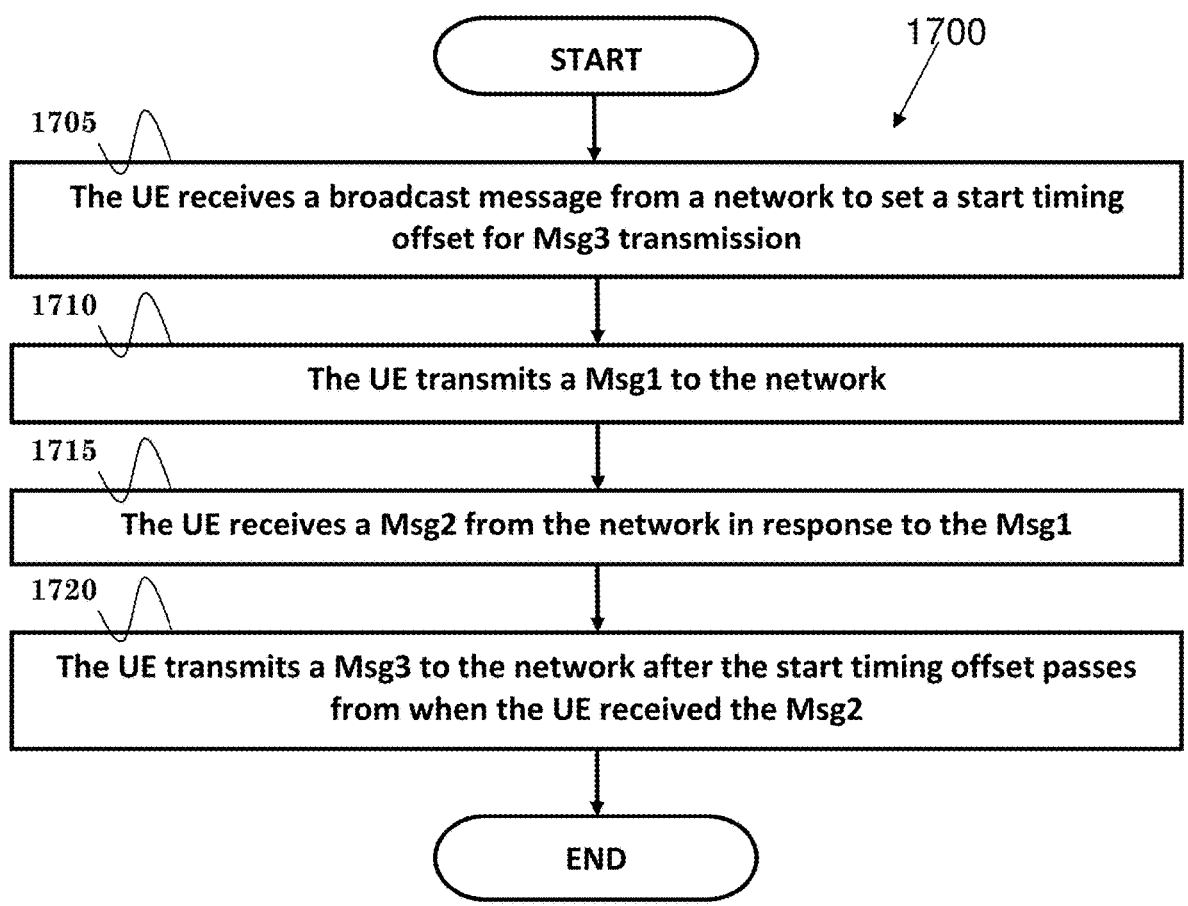
FIG. 17 is a flow chart according to one exemplary embodiment.

FIG. 17 is a flow chart 1700 according to one exemplary embodiment from the perspective of a UE. In step 1705, the UE receives a broadcast message from a network to set a start timing offset for Msg3 transmission. In step 1710, the UE transmits a Msg1 to the network. In step 1715, the UE receives a Msg2 from the network in response to the Msg1. In step 1720, the UE transmits a Msg3 to the network after the start timing offset passes from when the UE received the Msg2.

Referring back to FIGS. 3 and 4, in one exemplary embodiment of a UE, the device 300 includes a program code 312 stored in the memory 310. The CPU 308 could execute program code 312 to enable the UE (i) to receive a broadcast message from a network to set a start timing offset for Msg3 transmission, (ii) to transmit a Msg1 to the network, (iii) to receive a Msg2 from the network in response to the Msg1, and (iv) to transmit a Msg3 to the network after the start timing offset passes from when the UE received the Msg2. Furthermore, the CPU 308 can execute the program code 312 to perform all of the above-described actions and steps or others described herein.

Figure 18:
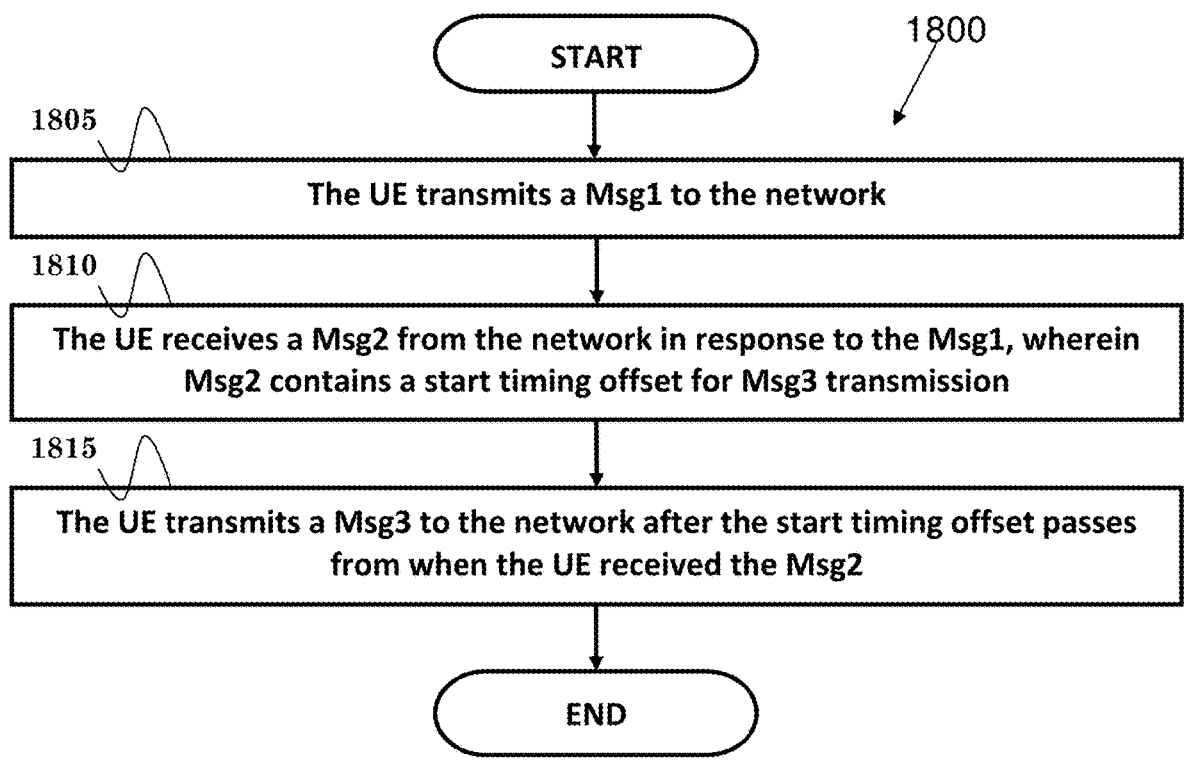
FIG. 18 is a flow chart according to one exemplary embodiment.

FIG. 18 is a flow chart 1800 according to one exemplary embodiment from the perspective of a UE. In step 1805, the UE transmits a Msg1 to the network. In step 1810, the UE receives a Msg2 from the network in response to the Msg1, wherein the Msg2 contains a start timing offset for Msg3 transmission. In step 1815, the UE transmits a Msg3 to the network after the start timing offset passes from when the UE received the Msg2.

Referring back to FIGS. 3 and 4, in one exemplary embodiment of a UE, the device 300 includes a program code 312 stored in the memory 310. The CPU 308 could execute program code 312 to enable the UE (i) to transmit a Msg1 to the network, (iii) to receive a Msg2 from the network in response to the Msg1, (ii) to receive a Msg2 from the network in response to the Msg1, wherein the Msg2 contains a start timing offset for Msg3 transmission, and (iii) to transmit a Msg3 to the network after the start timing offset passes from when the UE received the Msg2. Furthermore, the CPU 308 can execute the program code 312 to perform all of the above-described actions and steps or others described herein.

Figure 19:
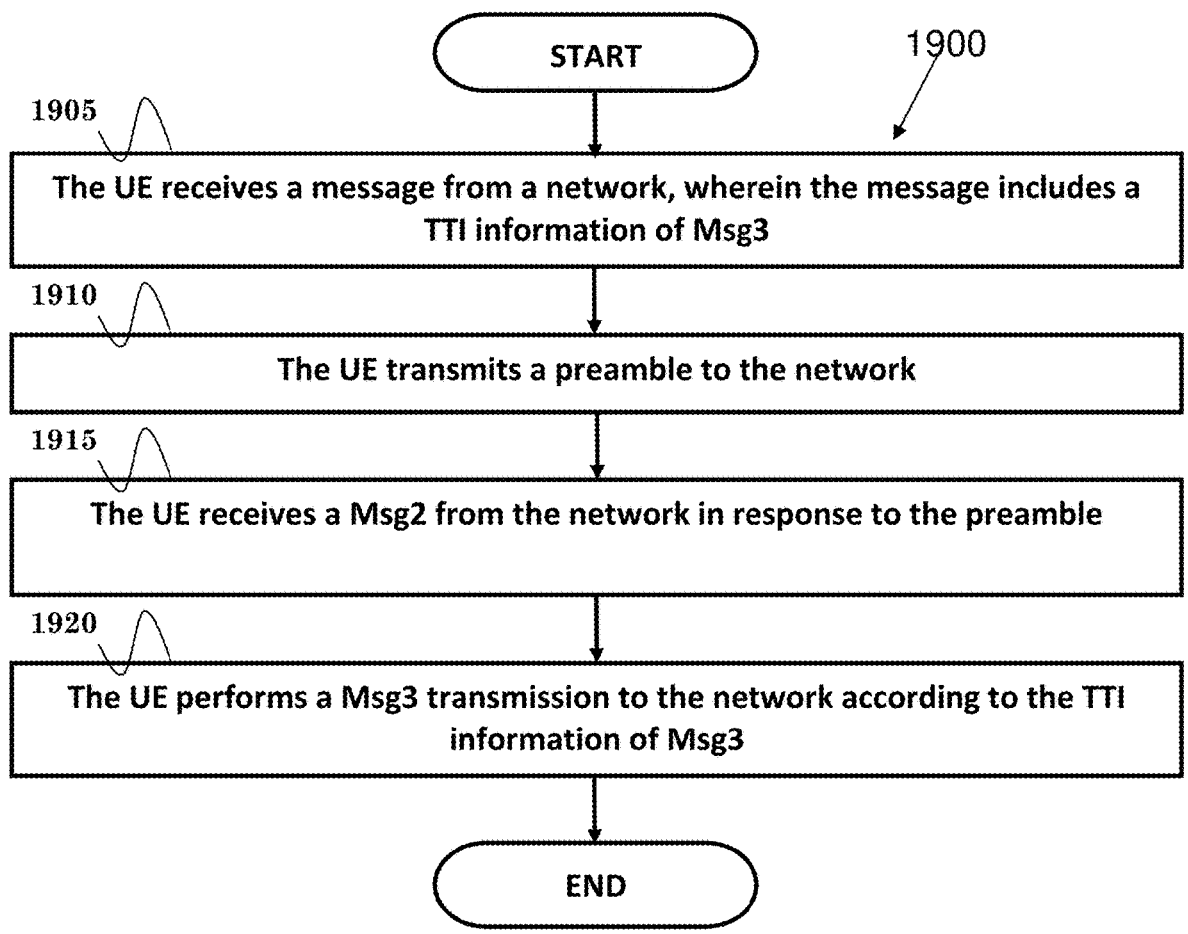
FIG. 19 is a flow chart according to one exemplary embodiment.

FIG. 19 is a flow chart 1900 according to one exemplary embodiment from the perspective of a UE. In step 1905, the UE receives a message from a network, wherein the message includes a TTI information of Msg3. In step 1910, the UE transmits a preamble to a network. In step 1915, the UE receives a Msg2 from the network in response to the preamble. In one embodiment, the TTI information of Msg3 is indicated in a common field for multiple RARs in the Msg2. In another embodiment, the TTI information of Msg3 is indicated in a RAR in response to the Msg1 transmission. In step 1915, the UE performs a Msg3 transmission to the network according to the TTI information of Msg3.

Referring back to FIGS. 3 and 4, in one exemplary embodiment of a UE, the device 300 includes a program code 312 stored in the memory 310. The CPU 308 could execute program code 312 to enable the UE (i) to receive a message from a network, wherein the message includes a TTI information of Msg3, (ii) to transmit a preamble to a network, (ii) to receive a Msg2 from the network in response to the preamble, and (iii) to perform a Msg3 transmission to the network according to the TTI information of Msg3. Furthermore, the CPU 308 can execute the program code 312 to perform all of the above-described actions and steps or others described herein.

With respect to the embodiments illustrated in FIGS. 12 through 19 and discussed above, in one embodiment, the UE selects a TTI information of Msg3 if there are multiple TTI information of Msg3 in the dedicated message, the broadcast message, or the Msg2. Furthermore, the TTI information of Msg3 could be included in a RAR in response to Msg1 or in a common field for multiple RARs in a Msg2.

In one embodiment, the UE selects a TTI information of Msg3 if there are multiple start timing offsets for Msg3 transmission in the dedicated message, the broadcast message, or the Msg2. Furthermore, the start timing offset of Msg3 could be included in a RAR in response to Msg1 or in a common field for multiple RARs in a Msg2.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/ processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it could be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a UE (User Equipment) for performing random access procedure, comprising:
   the UE transmits a preamble to a network;
   the UE receives a Msg2 containing a TTI (Transmission Timer Interval) information of a Msg3, associated with uplink, from the network in response to the preamble, wherein the TTI information, contained in the Msg2, of the Msg3, associated with uplink, includes a TTI duration of the Msg3, associated with uplink, and a start timing offset of the Msg3, associated with uplink; and
   the UE performs a single (TB) transport block of Msg3 transmission to the network according to the TTI information of the Msg3.

2. The method of claim 1, further comprising:
   the UE selects the TTI information of the Msg3 based on random access purpose, if there are multiple TTI information of the Msg3 in the Msg2.

3. The method of claim 1, further comprising:
   the UE selects the TTI information of the Msg3 based on a PRACH (Physical Random Access Channel) resource set of the preamble transmission or a preamble set of the preamble transmission, if there are multiple TTI information of the Msg3 in the Msg2.

4. The method of claim 1, further comprising:
   the UE selects the TTI information of the Msg3 based on highest priority of logical channel having data available for transmission, if there are multiple TTI information of the Msg3 in the Msg2.

5. The method of claim 1, wherein the TTI information of the Msg3 is included in a RAR (Random Access Response) for responding the preamble.

6. The method of claim 1, wherein the TTI information of the Msg3 is included in a common field for multiple RARs in the Msg2.

7. The method of claim 1, wherein the Msg2 is a random access response.

8. A User Equipment (UE), comprising:
   a control circuit;
   a processor installed in the control circuit; and
   a memory installed in the control circuit and operatively coupled to the processor;
   wherein the processor is configured to execute a program code stored in the memory to:
      transmit a preamble to a network;
      receive a Msg2 containing a TTI (Transmission Time Interval) information of a Msg3, associated with uplink, from the network in response to the preamble, wherein the TTI information, contained in the Msg2, of the Msg3, associated with uplink, includes a TTI duration of the Msg3, associated with uplink, and a start timing offset of the Msg3, associated with uplink; and
      perform a single (TB) transport block of Msg3 transmission to the network according to the TTI information of the Msg3.

9. The UE of claim 8, wherein the processor is further configured to execute the program code stored in the memory to:
   select the TTI information of the Msg3 based on random access purpose, if there are multiple TTI information of the Msg3 in the Msg2.

10. The UE of claim 8, wherein the processor is further configured to execute the program code stored in the memory to:
    select the TTI information of the Msg3 based on a PRACH (Physical Random Access Channel) resource set of the preamble or a preamble set of the preamble transmission, if there are multiple TTI information of the Msg3 in the Msg2.

11. The UE of claim 8, wherein the processor is further configured to execute the program code stored in the memory to:
    select the TTI information of the Msg3 based on highest priority of logical channel having available data, if there are multiple TTI information of the Msg3 in the Msg2.

12. The UE of claim 8, wherein the TTI information of the Msg3 is included in a RAR (Random Access Response) for responding the preamble.

13. The UE of claim 8, wherein the TTI information of the Msg3 is included in a common field for multiple RARs in the Msg2.

14. The UE of claim 8, wherein the Msg2 is a random access response.

* * * * *